Oct. 4, 1938. G. FICK 2,132,234

REFRIGERATING SYSTEM AND APPARATUS

Filed Aug. 9, 1934  2 Sheets-Sheet 1

INVENTOR.
George Fick
BY
ATTORNEY.

Oct. 4, 1938.  G. FICK  2,132,234
REFRIGERATING SYSTEM AND APPARATUS
Filed Aug. 9, 1934  2 Sheets-Sheet 2
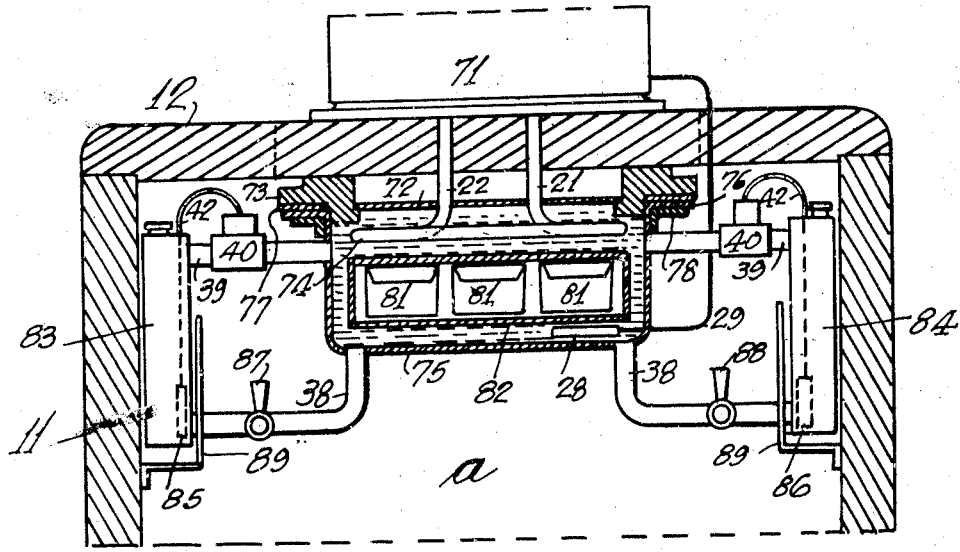
Fig. 3
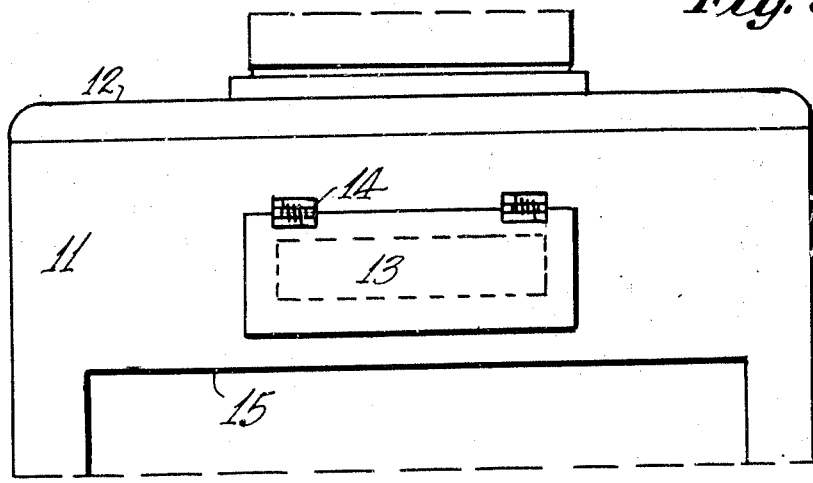
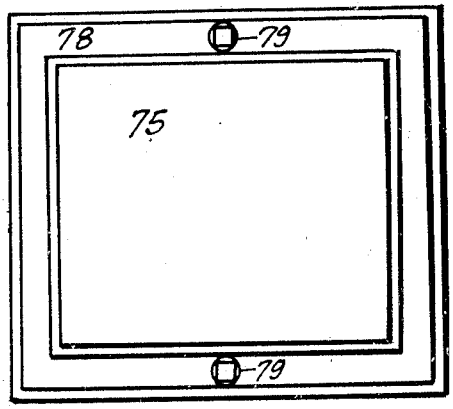
Fig. 5
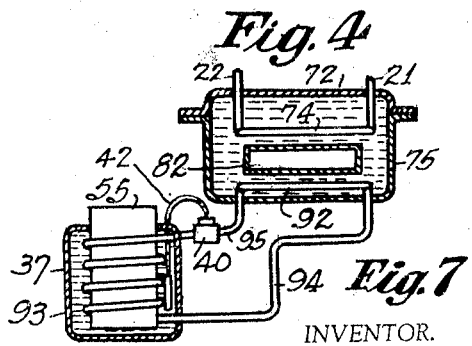
Fig. 4
Fig. 7
INVENTOR.
George Fick
BY M. H. Loughridge
ATTORNEY.

Patented Oct. 4, 1938

2,132,234

UNITED STATES PATENT OFFICE 2,132,234

REFRIGERATING SYSTEM AND APPARATUS

George Fick, Brooklyn, N. Y., assignor to Matthew H. Loughridge, Bogota, N. J., trustee Application August 9, 1934, Serial No. 739,109

16 Claims. (Cl. 62—95)

This application relates to refrigeration systems and has for an object to provide a main cooling receptacle or evaporator in a refrigerating system with sub-cooling receptacles dependent upon the main receptacle; another object of the invention is to provide a refrigerating system with a main cooling receptacle which is intermittently cooled by a mechanical refrigerating system and which has a cold storage capacity, with sub-cooling receptacles dependent thereon; another object of the invention is to provide a mechanically refrigerated main cooling receptacle which is thermostatically controlled and sub-cooling receptacles dependent upon the main cooling receptacle, the sub-cooling receptacle being independently controlled by a thermostat. A further object of the invention is to provide a refrigerating system with an evaporator having a cooling coil connected with a circulating refrigerant and provided with a heat transfer medium, and a second cooling receptacle connected with the first receptacle to provide for the flow of the heat transfer medium between said receptacles and a thermostat controlling the flow of said medium. Another object is to provide for a controlled circulation of brine between receptacles in the same cabinet and to control this circulation by thermostatic means without the use of electricity. Another object is to provide a cabinet having a brine tank with an open top and a cooling coil depending from a removable portion of the cabinet into the brine tank. Another object is to provide a cooling cabinet having a main door and having an independent small door, with an evaporator in the cabinet having a compartment for ice cubes in register with the small door. Other objects of the invention are more particularly described in the following specification and illustrated in the accompanying drawings, selected to show the application of the invention to electric water coolers and to household refrigerators, and in which;

Fig. 3 shows a portion of a household refrigerator with the main and the sub-cooling receptacle therein, the drawing being partly sectioned to show the details of construction;

Fig. 4 is an outside view of the refrigerator case used in Fig. 3;

Fig. 5 is a plan view, looking from below, of the evaporator used in Fig. 3;

Fig. 7 is a modification, partly sectioned, showing the use of a separate coil for the heat transfer medium.

This invention is applied to the small unit refrigerator having a high side or compressor mechanism and a low side or evaporator common to these machines.

The present invention is embodied in these refrigeration systems by providing in the evaporator a heat transfer medium which absorbs the refrigeration from the cooling coil and which can flow to a sub-cooling receptacle and be controlled by a thermostat. The evaporator may be constructed to freeze water in trays, generally known as ice cube trays, and in this way provide considerable cold storage for the heat transfer medium in the evaporator and stabilize the refrigeration in a mechanism which is operating intermittently. The sub-cooling receptacles may be located in the casing at points best adapted to distribute the refrigeration.

One particular use of the invention is to provide an evaporator with ice cube trays and with a cooling medium of a liquid character generally referred to as brine, and a second receptacle provided with connections for the circulation of the brine between the receptacles. The second receptacle is provided with a water chamber, or a water coil, connected with a suitable supply so that the machine in one compartment provides ice cubes and in the second compartment provides drinking water cooled to a suitable temperature. The evaporator is provided with a thermostat which controls the circulation of the refrigerant and the making of the ice cubes, and the second receptacle is provided with a thermostat which controls the flow of the heat transfer medium between the receptacles. By reason of the independent operation of the thermostats it is apparent that the main receptacle may be cooled to a temperature considerably below the freezing point of water and the second receptacle may be maintained at a temperature above the freezing point of water so that the water supply cannot freeze in the system, at the same time the reserve cold storage in the ice cubes, through the heat transfer medium, is available to maintain the water at a low temperature as it is drawn off for use. This mechanism, constituting the "low side" is placed within a heat insulated chamber.

Figure 1:
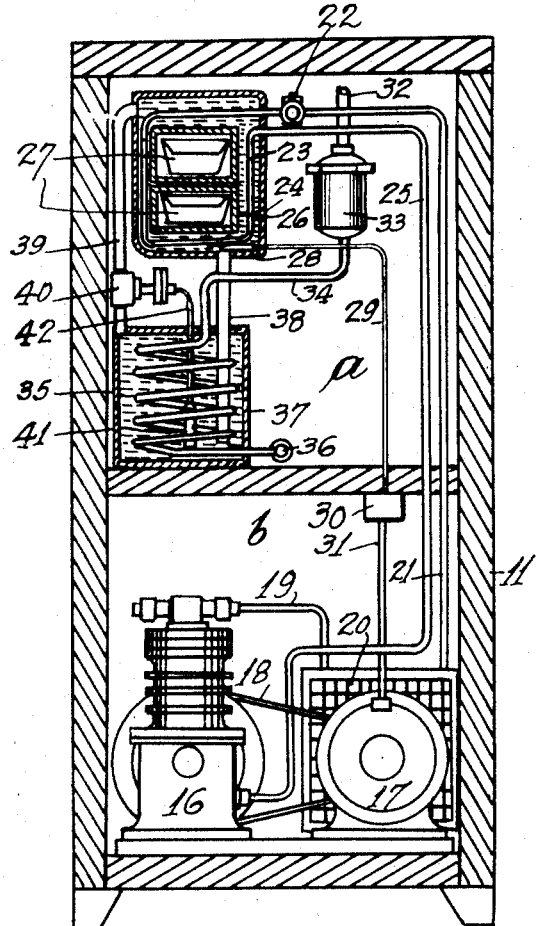
Fig. 1 is an elevation showing the invention applied to an electric water cooler in which the casing is shown in section and part of the apparatus is sectioned.

In the drawings 11 is a heat insulated housing which, in Fig. 1, has a cooling chamber $a$ and a compressor chamber $b$. The compressor chamber contains the compressor 16 operated by the electric motor 17 through the belt 18. The refrigerant is circulated from the compressor through pipe 19, condenser 20, pipe 21, expansion valve 22, cooling coil 23 in evaporator 24, and pipe 25 back to compressor. The evaporator 24 is provided with an inner chamber 26 in which the ice cube trays 27 are located, also the thermostat 28 is located in the evaporator and by pipe 29 connected to the control box 30 which controls the circuit of the motor 17 through the connection 31. This apparatus, or its equivalent, is to be found in the common refrigerator, and usually varies with the kind of refrigerant in the system; for instance, the cooling coil 23 may be a chamber in which the refrigerant expands, but is conveniently referred to as a cooling coil. The thermostat 28 is shown as located inside the evaporator, but this device may be located outside the evaporator and attached to, or remote from, the evaporator. In the construction in Fig. 3, where the cover with the high side is removed from the evaporator, it is necessary to locate the thermostat, or make its connection 29, detachable from the evaporator so that the high side may be removed by itself.

Pipe 32 is connected to a suitable water supply which may be filtered by the filter 33 and by pipe 34 connects to coil 35 in the second cooling chamber 37, the end of coil 35 being connected with a draw-off valve at 36.

The secondary cooling receptacle 37 is placed below the main cooling receptacle 24 and is connected therewith by the pipe 38 leading from the bottom of 24 to the bottom of 37, and a return pipe is provided at 39 leading from the top of 37 to the top of 24. A valve 40 is provided in the return connection 39, this valve being connected with the thermostat 41 located in 37, by the connection 42. The evaporator 24 is filled with a heat transfer medium usually referred to as brine, but may be any non-freezing, non-corrosive fluid that will flow under temperature differences and that can be controlled. The major cooling occurs in evaporator 24 and the brine or cooling medium tends to circulate from the higher receptacle to the lower receptacle by thermo-syphonic action. The extent of this circulation is controlled by the thermostat associated with the secondary cooling receptacle. This thermostat may be adjusted to stop the circulation at a temperature that will make the water in coil 35 suitable for beverage purposes. As long as the evaporator 24 is at a lower temperature than receptacle 37, the brine will act to transfer refrigeration from 24 to 37, and thus the cold stored in the ice cubes in the evaporator can be drawn upon to cool the water coil 35 independently of the operation of the mechanism. The independent thermostatic control of 37 makes it possible to provide ice cubes in the evaporator and, at the same time, prevents the water in 35 being frozen. It will be noted that the primary cooling receptacle 24 and the secondary cooling receptacle 37 are located in the heat insulated chamber $a$ and the control of the refrigeration to 37 is entirely within this chamber.

Figure 2:
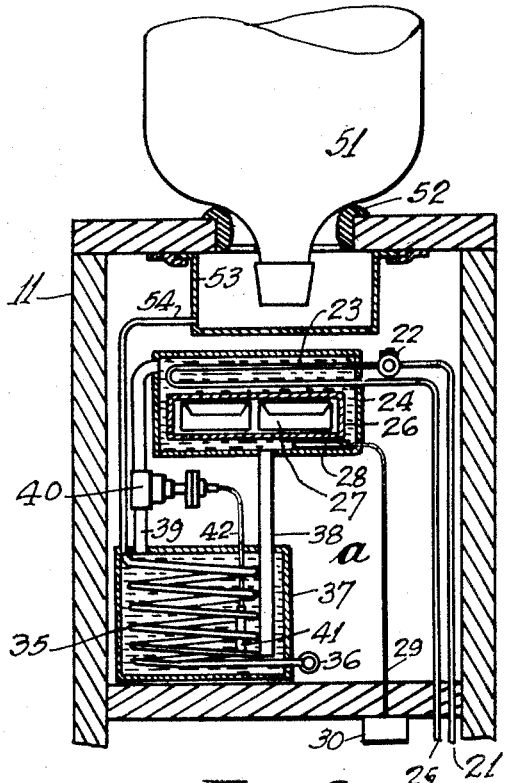
Fig. 2 shows the application of the invention to an electric water cooler adapted for water-bottle supply, with the casing and part of the apparatus sectioned.

The construction in Fig. 2 is modified from Fig. 1, by the use of a water bottle supply, instead of the city water mains. The bottle 51 is mounted on the rubber collar 52 on top of the box and discharges into the centrally located tank 53 which connects by pipe 54 to the water coil 35 in receptacle 37. In this construction the ice trays 27 are placed in a horizontal row in the evaporator and the cooling coil 23 is placed above the ice trays.

Figure 2A:
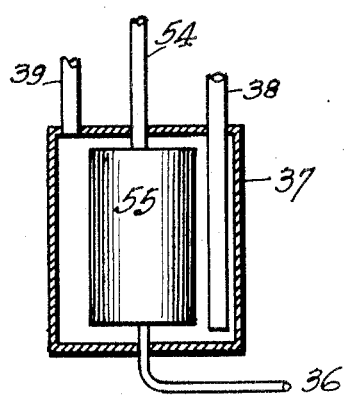
Fig. 2a is a modification, partly sectioned, showing the secondary cooling receptacle as may be used in Fig. 2.

In the modification in Fig. 2a, the coil 35 is replaced by the tank 55 placed inside 37. This provides a larger water capacity than the coil construction.

Figure 6:
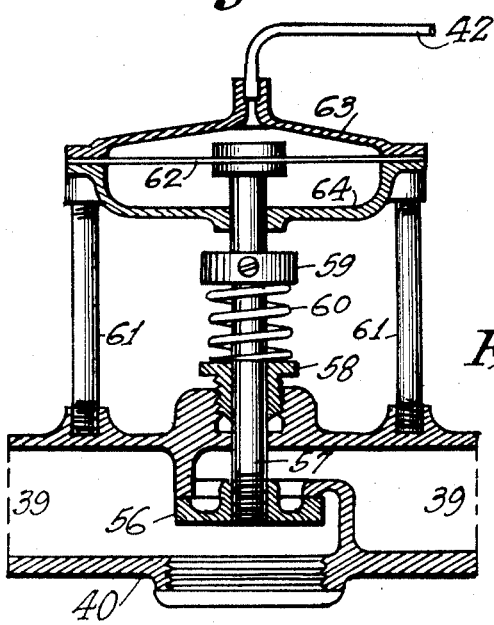
Fig. 6 is a form of valve shown in cross-section that may be operated by a thermostat for controlling the heat transfer medium.

The control valve 40, Fig. 6 comprises the diaphragm 62 enclosed by the covers 63 and 64, the pipe 42 connects to 63 so that when the pressure in the thermostatic bulb 41 increases, due to an increase in temperature, pressure is applied above diaphragm 62 and against spring 60 to lower the stem 57 and unseat the valve 56, thereby opening the passage through the valve proportional to the pressure of the volatile medium in the thermostat. The covers 63 and 64 are supported by the standards 61, the stem is provided with a stuffing box at 58 and the tension of spring 60 is adjusted by the collar 59. This valve is preferably placed in the return connection between the main cooling receptacle and the sub-cooling receptacle as the delivery line is liable to be covered with frost.

In Fig. 3 a pair of sub-cooling receptacles are connected with the evaporator, each controlled by an independent thermostat and manual means are provided for regulating the operation of each sub-cooling unit. In this construction the cover of the evaporator is removable with the cooling coil while the rest of the apparatus remains fixed in the chamber.

The housing 11 is provided with a removable cover 12 and with a door 13 having spring hinges at 14 to keep this door normally closed. The aperture for the main door is shown at 15 which provides access to the interior.

In the construction shown, the mechanism 71 for circulating the refrigerant is placed upon the cover 12 and the circulating pipes 21 and 22 depend therefrom through the cover 72 which protects the housing 12 to the cooling coil 74 located in the evaporator 75, above the compartment 82 for the ice cube trays 81. The part 74 is usually referred to as a cooling coil although it may take different forms. The edge of the evaporator is formed in a flange 76 which is clamped against the ring 73 of the cover through a gasket 77. One form of clamp comprises the angle brace 78 which may be secured by the bolts 79, Fig. 5 to the right and left of the front. By this construction the cover 12, or a portion of the casing opposite 73, may be removed with the cooling coil 74 after bolts 79 are removed, and replaced again without disturbing the remainder of the low side. It will be noted that there is practically no pressure in 75, the main purpose of the gasket is to prevent evaporation of the heat transfer medium in 75.

When the brace 78 is removed, the evaporator 75 is supported by the pipes 38 and 39. The compartment 82 also has connection with the housing leading to door 13, not shown in the drawings.

A sub-cooling receptacle 83 is provided at one side of the case and a corresponding sub-cooling receptacle 84 is provided on the opposite side. These receptacles are connected with the evaporator by the connections 38 and 39 and the connection 39 is controlled by valve 40. This valve for receptacle 83 is controlled by thermostat 85 and for receptacle 84 is controlled by thermostat 86 and the delivery connection for 83 is controlled manually by valve 87 and the delivery connection for 84 is controlled manually by valve 88. By adjusting the thermostats 85 and 86 to operate at different temperatures and by adjusting the valves 87 and 88 it is possible to obtain different cooling conditions on each side of the box, as might be desirable where different classes of material are located on each side. A wire shield or screen 89 may be provided as indicated to protect the sub-cooling units 83 and 84. It should be understood, although not shown in the drawings that these sub-receptacles are suitably secured to the wall of the housing.

The cover or small door 13, Fig. 4, is arranged to register with the chamber 82 for the ice cube trays, so that the trays may be removed and replaced without opening the main door. This door is provided with spring hinges at 14 giving it a bias to hold it normally closed. This retains the cold air around the evaporator in the upper part of the case while the ice cube trays can be freely removed from the case or housing without opening the main door at 15. In this arrangement, it will be noted that the major cooling effect is produced in the upper central portion of the casing and the sub-cooling is distributed at the sides, this tends to produce a uniform chilling of the lower part of the casing.

In the arrangement in Fig. 7, the heat transfer between the evaporator and the sub-cooling unit is obtained by the coil 92 placed below the cube compartment 82 and connecting by the pipes 94 and 95 with the coil 93, surrounding the tank 55 in receptacle 37. The control valve 40 is provided in pipe 95. A suitable heat transfer medium is placed in coil 92 which circulates through coil 93 in brine tank 37 and thereby chills the water in tank 55.

The invention admits of a variety of applications in addition to those shown in the drawings and may be used completely as shown, or its integral parts may be used separately with other apparatus.

Having thus described my invention, I claim:

1. A refrigerating system comprising a cabinet with a single chamber having a main cooling receptacle with a cooling coil therein and means for circulating a refrigerant through said coil, a heat transfer medium in said main receptacle, a thermostat controlling the operation of said circulating means, an independent sub-cooling receptacle spaced from the main receptacle, means connecting said receptacles and providing for the flow of said heat transfer medium between said receptacles and a thermostat controlling such flow, said sub-receptacle, connections and thermostat located in said chamber.

2. A refrigerating system comprising a single chamber having a main cooling receptacle with a cooling coil and a heat transfer medium therein, means for circulating a refrigerant through said coil, a thermostat associated with said main cooling receptacle controlling the operation of said means, a sub-cooling receptacle in said chamber spaced from said main receptacle, a pipe with a valve operated by fluid pressure connecting said receptacles and providing for the flow of the heat transfer medium between said receptacles and a thermostat supplying fluid pressure for operating said valve associated with said sub-cooling receptacle.

3. A refrigerating system comprising a cabinet with a single chamber having a main cooling receptacle with a cooling coil and a heat transfer medium therein, means for circulating a refrigerant through said coil, a thermostat associated with said main cooling receptacle controlling the operation of said means, a sub-cooling receptacle in said chamber spaced from the main receptacle, means associating a water supply with said sub-cooling receptacle for cooling the water, a pipe with a valve operated by fluid pressure connecting said receptacles and providing for the flow of said heat transfer medium between said receptacles and a thermostat associated with said sub-cooling receptacle supplying fluid pressure for operating said valve.

4. A refrigerating system comprising a cabinet with a single chamber having a main cooling receptacle with a cooling coil and a heat transfer medium therein, means for circulating a refrigerant through said coil, a thermostat controlling the operation of said means, a pair of sub-cooling receptacles spaced from said main receptacle in said chamber, means connecting said main receptacle with said sub-receptacles providing for the flow of said heat transfer medium between said receptacles and a thermostat associated with each sub-receptacle independently controlling such flow between each sub-receptacle and the main receptacle.

5. A refrigerating system comprising a cabinet with a single chamber having a main cooling receptacle with a cooling coil and a heat transfer medium therein, means for circulating a refrigerant through said coil, a thermostat controlling the operation of said means, a sub-cooling receptacle in said chamber spaced from said main receptacle, means connecting said main receptacle with said sub-cooling receptacle and providing for the flow of said heat transfer medium between said receptacles, a valve operated by fluid pressure controlling such flow and a thermostat supplying fluid pressure for operating said valve in accordance with variations of the temperature of said sub-receptacle.

6. A refrigerator system comprising a single chamber with a main cooling receptacle comprising a cooling coil and a brine tank therein, means for circulating a refrigerant through said coil, a thermostat controlling the operation of said means, a sub-cooling receptacle in said chamber spaced from said main receptacle, means connecting said main receptacle and said sub-cooling receptacle and providing for the flow of brine between said receptacles, means controlling the flow of said brine manually and thermostatically operated means within said chamber controlling said flow.

7. A refrigerating system comprising a single chamber with a main cooling receptacle having a cooling coil and a heat transfer medium therein, means for circulating a refrigerant through said coil, a thermostat controlling the operation of said means, a sub-cooling receptacle in said chamber spaced from said main receptacle, a pipe connecting said main receptacle to said sub-receptacle and a second pipe connecting said sub-receptacle to said main receptacle for the return flow of said medium from said sub-receptacle to said main receptacle, a valve in said second pipe and thermostatic means controlling said valve, said pipes, valve and thermostat being located within said chamber.

8. A refrigerator system comprising a single chamber having a main cooling receptacle with a cooling coil and a heat transfer medium therein, means for circulating a refrigerant through said coil, a thermostat controlling the operation of said means, an independent sub-cooling receptacle, spaced from and located on a lower level in said chamber, than said main receptacle, a connection including a valve for said receptacles providing for the flow of said medium between said receptacles and a thermostat associated with said sub-cooling receptacle directly controlling said valve.

9. In a refrigerator, the combination of, a chamber, an evaporator casing located at the top of said chamber, a removable cooling coil inserted in said evaporator casing from the top, means for circulating a refrigerant in said coil and a thermostat controlling the operation of said means, and a sub-cooling receptacle operatively connected with said evaporator casing but not with said cooling coil and located at the side of said chamber.

10. In a refrigerator, the combination of, a cabinet, an evaporator located at the top of the cabinet and comprising a brine tank, means therein for forming ice cubes and a cooling coil arranged in said tank, means for circulating a refrigerant in said coil, a thermostat controlling the operation of said means, a pair of sub-cooling receptacles located below and one to each side of said evaporator, pipes connecting said sub-cooling receptacles with said evaporator for the circulation of brine between said tank and said receptacles, a valve in each of said circulating pipes and thermostatic means in said receptacles controlling the operation of said valves.

11. In a refrigerator, the combination of, a chamber having a main door opening in the wall thereof providing access to the interior, an evaporator comprising a cooling coil and a heat transfer medium, for making ice cubes, located at the top of the cabinet and above the main door opening, means for circulating a refrigerant in said coil, a thermostat controlling the operation of said means, an independent sub-cooling receptacle located in said chamber below said evaporator, means operatively connecting said sub-cooling receptacle with said evaporator, but not with said cooling coil, whereby said receptacle is cooled from said evaporator and a second door opening in the wall of said cabinet registering with the ice cube compartment of said evaporator whereby the ice cubes are made available independently of the main door opening.

12. A refrigerator system comprising a compartment having a cooling receptacle with a hollow chamber therein forming the housing of an evaporator, a removable cover for said receptacle, means for supporting said receptacle in said compartment independently of the removable cover, a cooling coil depending from said cover into said hollow chamber, a heat transfer medium in said hollow chamber, means for circulating a refrigerant in said coil, a thermostat controlling the operation of said means and means for securing said chamber to said cover to form a closure.

13. A refrigerator comprising a housing having a removable cover, a hollow chamber in said housing forming part of an evaporator, means for supporting said chamber in said housing independently of the removable cover, a cooling coil supported by said cover in said hollow chamber and being removable with said cover and means for circulating a refrigerant in said coil.

14. A refrigerator comprising a housing having a removable wall portion, an annular member having a flange secured to said wall portion, a cooling coil removable with said wall portion, means for circulating a refrigerant in said coil, and a casing in said housing supported independently of said removable wall portion and registering with said annular member to form an enclosure for said coil.

15. A refrigerator comprising a housing having a removable wall portion, an annular member with a flange secured against said wall portion, a cooling coil supported in said housing by said removable wall portion, means for circulating a refrigerant in said coil and a chamber in said housing open at the top to receive said cooling coil and secured to said flange to form therewith a closure and a heat exchange medium in said chamber.

16. A refrigerator comprising a housing having a removable wall portion, an annular member with a flange secured against said wall portion, a cooling coil supported in said housing by said removable wall portion, means for circulating a refrigerant in said coil, a chamber for enclosing said coil and means for clamping said chamber to said flange.

GEORGE FICK.